United States Patent [19]
Tomisawa

[11] Patent Number: 5,507,180
[45] Date of Patent: Apr. 16, 1996

[54] APPARATUS AND METHOD FOR DETECTING ROUGH ROAD TRAVEL OF A VEHICLE, AND APPARATUS AND METHOD FOR DETECTING MISFIRE OF A VEHICLE ENGINE

[75] Inventor: Naoki Tomisawa, Atsugi, Japan

[73] Assignee: Unisia Jecs Corporation, Atsugi, Japan

[21] Appl. No.: 419,600

[22] Filed: Apr. 10, 1995

[30] Foreign Application Priority Data

Apr. 11, 1994 [JP] Japan ................. 6-072203

[51] Int. Cl.$^6$ ................................ G01M 15/00
[52] U.S. Cl. .................................. 73/117.3
[58] Field of Search ............. 73/115, 116, 117.2, 73/117.3; 364/431.07, 431.08

[56] References Cited

U.S. PATENT DOCUMENTS

| | | | |
|---|---|---|---|
| 4,424,709 | 1/1984 | Meier et al. | 73/115 |
| 4,892,075 | 1/1990 | Iriyama et al. | 73/115 |
| 5,041,980 | 8/1991 | Maddock et al. | 73/116 |
| 5,095,742 | 3/1992 | James et al. | 73/116 |
| 5,125,267 | 6/1992 | Kuroda et al. | 73/115 |
| 5,127,262 | 7/1992 | Demizu et al. | 73/115 |
| 5,331,848 | 7/1994 | Nakagawa et al. | 73/116 |
| 5,355,717 | 10/1994 | Tanaka et al. | 73/118.1 |
| 5,357,788 | 10/1994 | Kantschar et al. | 73/116 |

FOREIGN PATENT DOCUMENTS

| | | |
|---|---|---|
| 6415937 | 1/1926 | Japan. |
| 62-26345 | 2/1987 | Japan. |
| 63-70048 | 5/1988 | Japan. |
| 4-64065 | 2/1992 | Japan. |

*Primary Examiner*—Richard Chilcot
*Assistant Examiner*—George M. Dombroske
*Attorney, Agent, or Firm*—Foley & Lardner

[57] ABSTRACT

A signal indicating that a road on which a vehicle is travelling is not a rough road is output when a fluctuation frequency of an engine rotational speed and a fluctuation frequency of a combustion pressure are in approximate agreement, and a fluctuation amplitude of an engine rotational speed is greater by a predetermined value or above than a fluctuation amplitude of a combustion pressure. In other cases a signal indicating that the road on which the vehicle is travelling is not a rough road is output. During rough road travel, misfire detection based on engine rotational speed or combustion pressure is inhibited.

10 Claims, 6 Drawing Sheets

APPARATUS AND METHOD FOR DETECTING ROUGH ROAD TRAVEL OF A VEHICLE, AND APPARATUS AND METHOD FOR DETECTING MISFIRE OF A VEHICLE ENGINE

1. Field of the Invention

The present invention relates to an apparatus and method for detecting rough road travel of a vehicle, and an apparatus and method for detecting misfire of the vehicle engine. In particular the present invention relates to technology for determining if a road on which a vehicle is travelling is a rough road, and to technology for avoiding erroneous detection of misfire due to influence from the road surface.

2. Description of the Related Art

Technology for detecting misfire based on engine rotational fluctuations is known (refer to Japanese Unexamined Patent Publication No. 4-64065).

With the misfire detection method disclosed in Japanese Unexamined Patent Publication No. 4-64065, a rotation signal for each reference angle, and a rotation signal for each unit angle, are taken from the engine flywheel. The engine rotational period is then measured based on these rotation signals, and misfire is detected based on fluctuations in the rotational period.

Moreover, Japanese Utility Model Unexamined Publication No. 64-15937, and Japanese Unexamined Patent Publication No. 62-26345 disclose apparatuses for detecting misfire based on a peak time of the combustion pressure or an integral value of combustion pressure.

However, when a vehicle is travelling on a rough road (bumpy road or gravel road etc.), the tire is subjected to reaction forces from the road surface so that rotational fluctuations arise. These are transmitted via the drive shaft and transmission system to the engine, causing fluctuations in engine rotation.

Therefore, when misfire is detected based on fluctuations in engine rotation, since it is not possible to distinguish between fluctuations in engine rotation caused by rough road travel, and fluctuations in engine rotation caused by misfire, then there is the likelihood of erroneous detection of misfire when travelling on a rough road.

Similarly, when detecting misfire based on engine combustion pressure, although the influence from the road surface is relatively small there is again the likelihood of erroneous detection of misfire when travelling on a rough road.

The above problems can be tentatively solved if a special sensor such as an ultrasonic-type road surface sensor is provided for detecting the road surface condition, and at the time of rough road travel, misfire detection based on rotational fluctuation of the engine, or combustion pressure is cancelled. However, even if the road surface condition with a special sensor is detected, it is difficult to collate the road surface condition detected by the special sensor with road surface conditions which will influence misfire detection. As a result, there is the likelihood of undue limitation of the opportunity for misfire detection, or on the other hand of misfire detection being carried out normally while in the normal situation, there is the possibility of erroneous detection due to the road surface influence. Moreover, the installation of a special sensor for detecting the road surface condition adds to the cost.

SUMMARY OF THE INVENTION

In view of the above problems, it is an object of the present invention to provide an apparatus and method for detecting rough road travel which can accurately detect without the requirement for a special sensor, rough road travel conditions which have an undesirable influence on misfire detection.

Moreover it is a further object of the present invention to provide a method and apparatus for detecting misfire which utilizes the above-mentioned apparatus for detecting rough road travel to ensure that misfire is not erroneously detected when travelling on a rough road.

To achieve the above objects, an apparatus for detecting rough road travel of a vehicle according to the present invention detects a rotational speed and combustion pressure of an engine respectively and compares the fluctuation characteristics thereof, to thereby output a judgement signal indicating whether or-not a road on which the vehicle is travelling is a rough road.

With such a construction, it is judged whether or not a vehicle is travelling on a rough road, depending on if a correlation between the fluctuation characteristics of the engine rotational speed, and the fluctuation characteristics of the engine combustion pressure is peculiar to rough road travel.

More specifically, when travelling on a rough road, the influence of the fluctuations transmitted back from the tires affects both the engine rotational speed and the combustion pressure. However the influence affecting the engine rotational speed and the combustion pressure differs in degree. It can therefore be judged if a road is rough depending on whether or not a fluctuation characteristic detected at the time shows a characteristic peculiar to the rough road.

Here, the fluctuation characteristic may be at least one of fluctuation frequency and fluctuation amplitude.

With such a construction, the degree of influence on the engine rotational speed and combustion pressure due to rough road travel is judged as a change in the fluctuation frequency and or a change in the fluctuation amplitude of the rotational speed, and the combustion pressure of the engine.

Moreover the construction may be such that, when the fluctuation frequency is used as the fluctuation characteristic, a signal indicating that a road on which the vehicle is travelling is a non-rough road is output when the fluctuation frequency of the engine rotational speed and the fluctuation frequency of the combustion pressure are not in agreement, and a signal indicating that the road on which the vehicle is travelling is a rough road is output at least under conditions where the fluctuation frequency of the engine rotational speed and the fluctuation frequency of the combustion pressure are in agreement.

At the time of rough road travel, due to the reverse transmission of the tire rotational fluctuations back to the engine, both the engine rotational speed and the combustion pressure are influenced by the tire rotational fluctuations, and therefore fluctuate. There is therefore at least no case wherein the fluctuation frequency of the engine rotation and the fluctuation frequency of the combustion pressure differ significantly. Accordingly, when the fluctuation frequency of the engine rotational speed and the fluctuation frequency of the combustion pressure do not agree, it can be assumed that the fluctuations are not due to rough road travel.

Furthermore, the construction may be such that when both the fluctuation frequency and the fluctuation amplitude are used as fluctuation characteristics, a signal indicating that the road on which the vehicle is travelling is a rough road is output when the fluctuation frequency of the engine rotational speed and the fluctuation frequency of the combustion pressure are in approximate agreement and the fluctuation amplitude of the engine rotational speed is greater by a predetermined value or above than the fluctuation amplitude of the combustion pressure, and a signal indicating that the road on which the vehicle is travelling is not a rough road is output in other cases.

The fluctuations transmitted back from the tires due to rough road travel have a significant influence on the engine rotational speed. Therefore taking the combustion pressure fluctuations as a basis, the fluctuations in rotational speed at the time of rough road travel is greater than the fluctuations in rotational speed generated in correspondence with the normal combustion pressure fluctuations. Accordingly, when the fluctuation frequencies are in approximate agreement, and the fluctuation of the engine rotational speed is greater by a predetermined value or above than the fluctuation of the combustion pressure, it can be assumed that this is because a fluctuation cause due to rough road travel is having a large influence on the rotational speed.

Moreover, the construction may be such that the device for detecting engine rotational speed takes an engine rotation signal from the engine flywheel.

Such a construction wherein the engine rotation signal is taken, not for example from the camshaft, but from the flywheel which directly receives the influence of the fluctuation transmitted back from the tires, increases the influence that the rough road travel has on the detection value of the engine rotational speed, and adds a difference to the influence exerted on the combustion pressure, thereby achieving accuracy in judging rough road travel.

With regards to an apparatus for detecting misfire of a vehicle engine according to the present invention which outputs a misfire detection signal based on at least one of engine rotational speed and combustion pressure, the output of the misfire detection signal is inhibited when a signal indicating that the road on which the vehicle is travelling is a rough road is output from the apparatus for detecting rough road travel.

With such a construction, when a rough road travel condition is detected based on a comparison of the fluctuation characteristics for the engine rotational speed and the fluctuation characteristics for the combustion pressure, misfire detection is inhibited. Hence when rotation fluctuations and combustion pressure fluctuations are produced by the influence of the fluctuations transmitted back from the tires to the engine, erroneous detection that these fluctuations are the consequence of misfire is avoided.

Moreover a method of detecting rough road travel of a vehicle according to the present invention includes outputting a signal indicating that a road on which the vehicle is travelling is a non-rough road when a fluctuation frequency of an engine rotational speed and a fluctuation frequency of a combustion pressure are not in agreement, and outputting a signal indicating that the road on which the vehicle is travelling is a rough road, at least under conditions where the fluctuation frequency of the engine rotational speed and the fluctuation frequency of the combustion pressure are in agreement.

At the time of rough road travel, there is at least no case wherein the fluctuation frequency of the engine rotation and the fluctuation frequency of the combustion pressure differ significantly. Therefore, when the fluctuation frequency of the engine rotational speed and the fluctuation frequency of the combustion pressure do not agree, it can be assumed that the fluctuations are not due to rough road travel. On the other hand, when the fluctuation frequencies are in approximate agreement, it can be assumed that both the rotational speed and the combustion pressure are receiving a fluctuation influence from the rough road travel.

Moreover, a method of detecting rough road travel of a vehicle according to the present invention includes, outputting a signal indicating that a road on which the vehicle is travelling is a rough road when a fluctuation frequency of an engine rotational speed and a fluctuation frequency of a combustion pressure are in approximate agreement and a fluctuation amplitude of the engine rotational speed is greater by a predetermined value or above than a fluctuation amplitude of the combustion pressure, and outputting a signal indicating that the road on which the vehicle is travelling is not a rough road in other cases.

The fluctuations transmitted back from the tires due to rough road travel have a significant influence on the engine rotational speed. Therefore taking the combustion pressure fluctuations as a basis, the fluctuations in rotational speed at the time of rough road travel is greater than the fluctuations in rotational speed generated in correspondence with the normal combustion pressure fluctuations. Accordingly, when the fluctuation frequencies are in approximate agreement, and the fluctuation of the engine rotational speed is greater by a predetermined value or above than the fluctuation of the combustion pressure, it can be assumed that this is because a fluctuation cause due to rough road travel is having a large influence on the rotational speed.

With regards to a method of detecting misfire of a vehicle engine according to the present invention, output of a misfire detection signal, based on at least one of engine rotational speed and combustion pressure, is inhibited when detected by the rough road travel detection method that there is rough road travel.

With such a construction, at the time of rough road travel when rotation fluctuations and combustion pressure fluctuations are produced by the influence of the fluctuations transmitted back from the tires to the engine, erroneous detection that these fluctuations are the consequence of misfire is avoided.

Further objects and aspects of the present invention will become apparent from the following description of the embodiments given in conjunction with the appended drawings.

DESCRIPTION OF THE PREFERRED EMBODIMENTS

As follows is a description of embodiments of the present invention.

Figure 2:
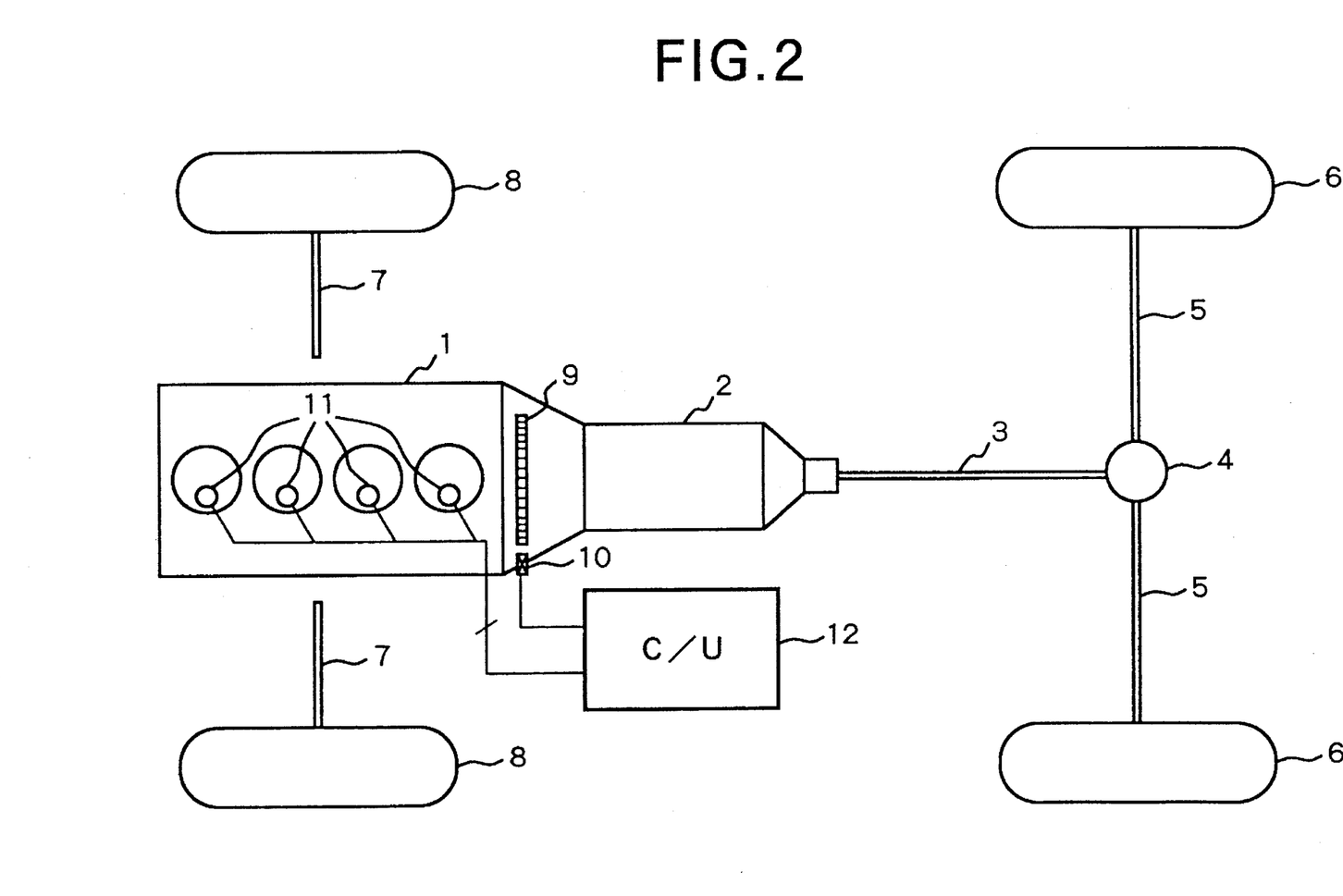
FIG. 2 is a schematic system diagram illustrating an embodiment of the present invention.

FIG. 2 shows an overall structure of a vehicle of an embodiment of the present invention. In FIG. 2, a transmission 2 is connected to an output shaft of an engine 1, while an output shaft of the transmission 2 is connected by way of a propeller shaft 3 and a differential 4 to a rear axle shaft 5 having rear wheels 6 connected to both ends thereof. Moreover front wheels 8 are supported on a front axle 7.

Figure 1:
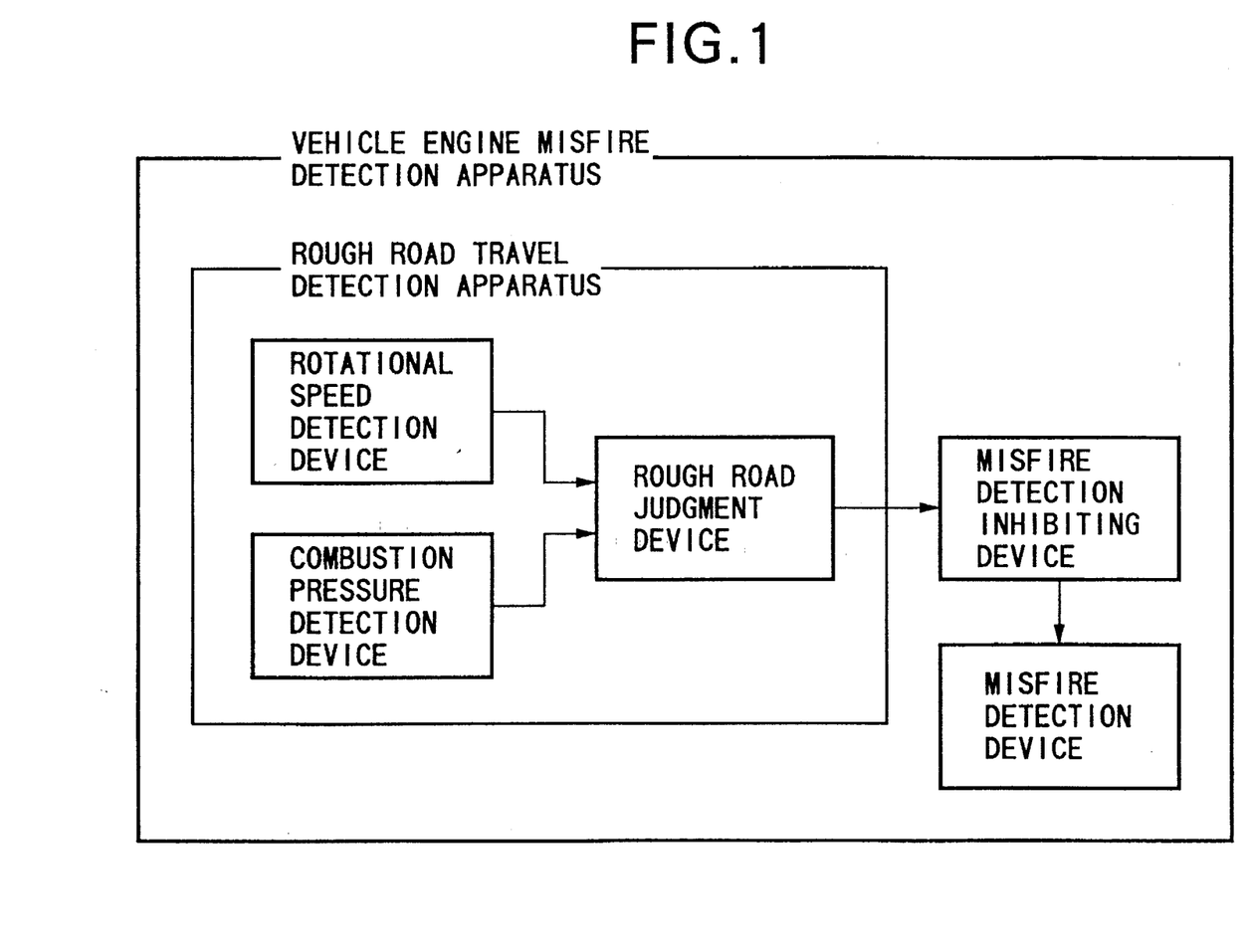
FIG. 1 is a block diagram showing a basic construction of a rough road detection apparatus and a misfire detection apparatus according to respective aspects of the present invention.

A flywheel 9 supported on the output shaft of the engine 1, is provided with a ring gear which engages with a starter motor (not shown). An electromagnetic pickup 10 (rotational speed detection device: see FIG. 1)is provided for detecting the ring gear teeth (or a receiving portion provided for rotation detection) to obtain a reference signal REF for each reference crank angle.

Each cylinder of the engine 1 is provided with a pressure sensor 11 (combustion pressure detection device: refer to FIG. 1) for detecting combustion pressure. With the present embodiment, a device which is fitted as an ignition plug washer such as disclosed in Japanese Utility Model Unexamined Publication No. 63-70048 is used for the pressure sensor 11. More specifically, the pressure sensor 11 is a ring type pressure sensor clamped to the attachment faces of the ignition plug which is screwed into the cylinder head. The combustion pressure (cylinder pressure) is detected from an output (voltage signal) of the pressure sensor 11.

The pressure sensor 11 however is not limited to the above-mentioned type fitted as an ignition plug washer, and a device such as one wherein the sensor portion faces directly into the combustion chamber is also clearly possible.

Detection signals from the electromagnetic pickup 10 and the pressure sensor 11 are input to a control unit 12 which incorporates a microcomputer. As shown by the flow chart of FIG. 3, the control unit 12 detects whether or not the road on which the vehicle is travelling is rough road (bumpy road or gravel road etc.) based on the detection signals, and diagnoses engine misfire conditions.

Figure 3:
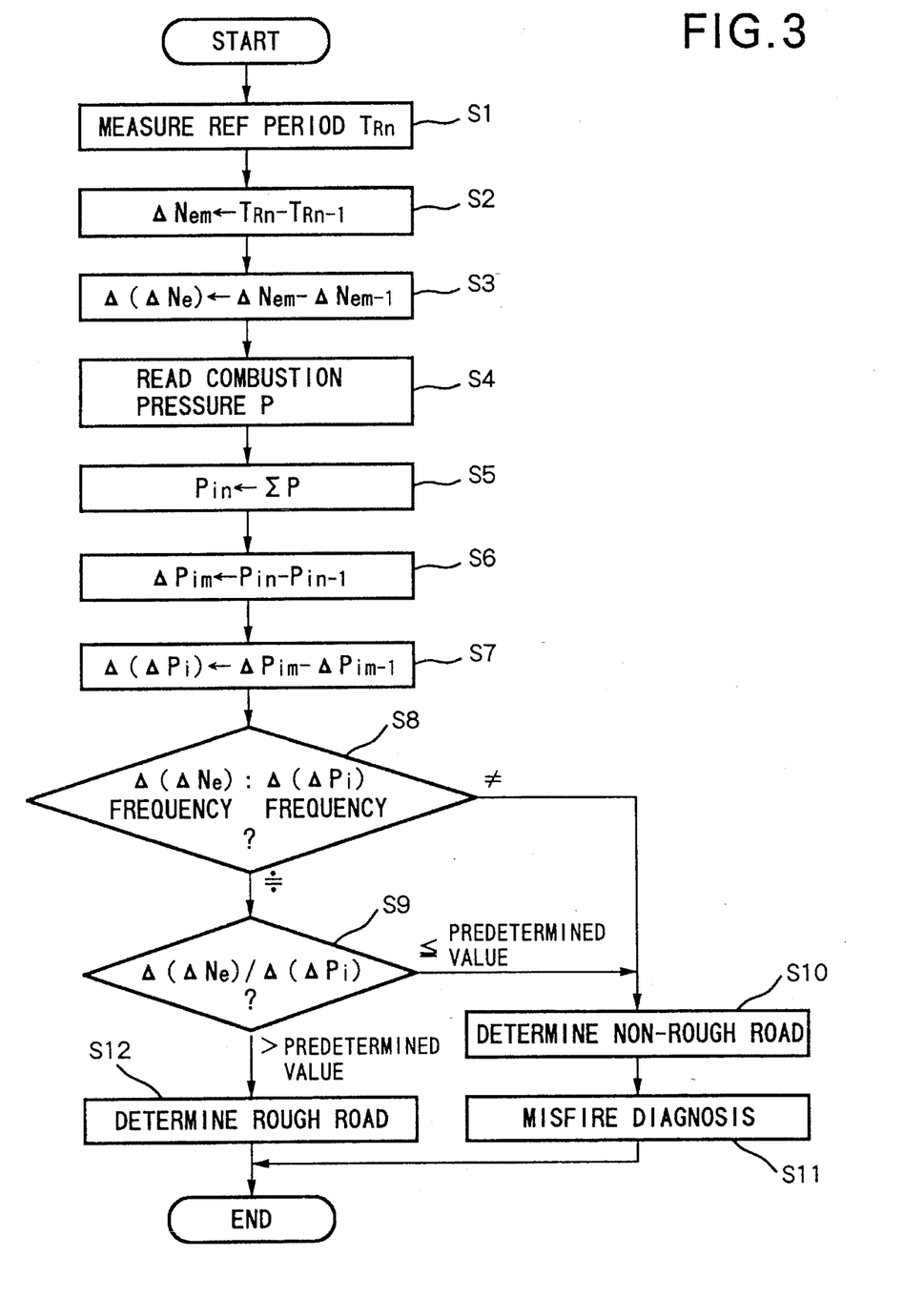
FIG. 3 is a flow chart illustrating aspects of rough road detection and misfire diagnosis routine according to the embodiment.

With the present embodiment, the functions of a rough road judgment device, a misfire detection device, a misfire detection inhibiting device (refer to FIG. 1) are realised by software illustrated by the flow chart of FIG. 3 and stored in the control unit 12. More specifically, the vehicle of the present embodiment is provided with both, the apparatus for detecting rough road travel of a vehicle according to the present invention, and the apparatus for detecting misfire of a vehicle engine according to the present invention.

In the flowchart of FIG. 3, initially in step 1 (with "step" denoted by S in the FIG. 3) a generation period $T_{Rn}$ of the reference angle signal REF is computed for each predetermined crank angle (for example each 180° crank angle which corresponds to the stroke phase difference between cylinders in a four cylinder four cycle engine), obtained based on the detection signal from the electromagnetic pickup 10.

Then in step 2, a difference $\Delta N_{em}$ $(=T_{Rn}-T_{Rn}-1)$between the latest measured period $T_{Rn}$ and the previously measured period $T_{Rn}-1$ is obtained.

Figure 4:
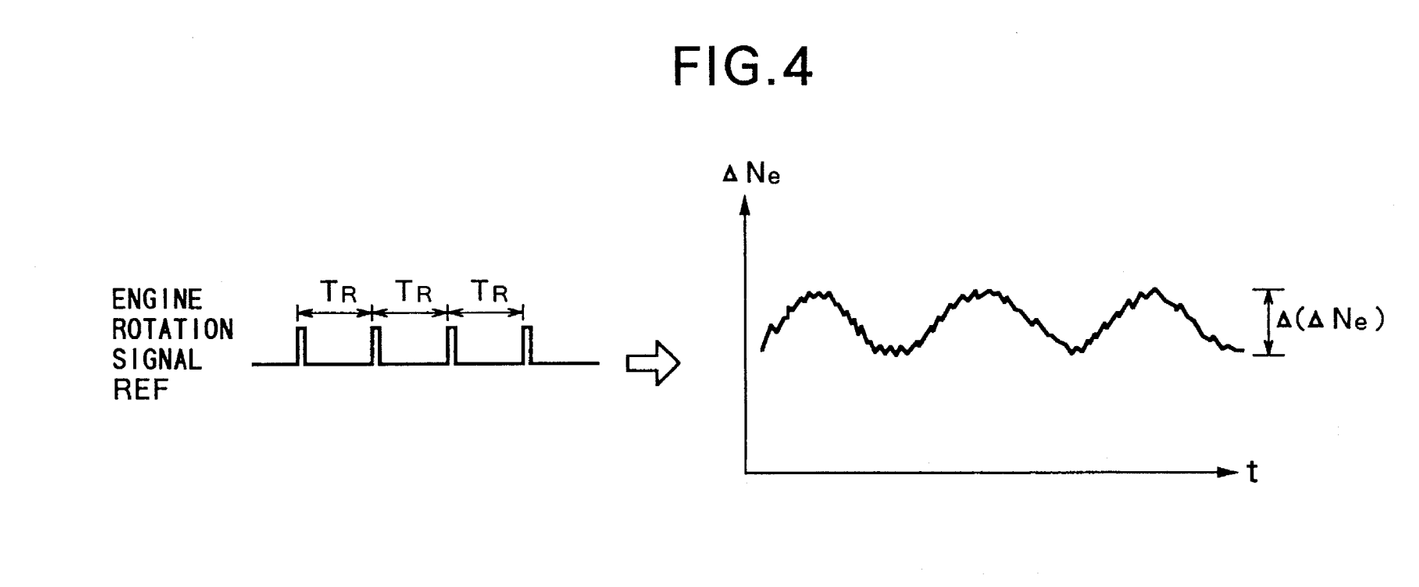
FIG. 4 is a diagram illustrating parameters representing rotational speed fluctuations according to the embodiment.

In step 3 a difference between the latest computed difference $\Delta N_{em}$ and a previous difference value $\Delta N_{em}-1$ $(\Delta(\Delta N_{em})=\Delta N_{em}\Delta N_{em}-1)$ is set as a parameter $\Delta(\Delta N_{em})$ which indicates the fluctuation amplitude of the engine rotational speed (refer to FIG. 4).

In step 4, a combustion pressure P detected by the pressure sensor 11 is A/D converted and read. Then in step 5, the combustion pressure P is integrated over a predetermined integral interval for each combustion cycle to obtain a combustion pressure integral value $Pi_n$.

Then in step 6, a difference $\Delta Pi_m$ between the latest computed $Pi_n$ and the previously computed $Pi_{n-1}$ is obtained $(\Delta Pi_m=Pi_n-Pi_{n-1})$.

Figure 5:
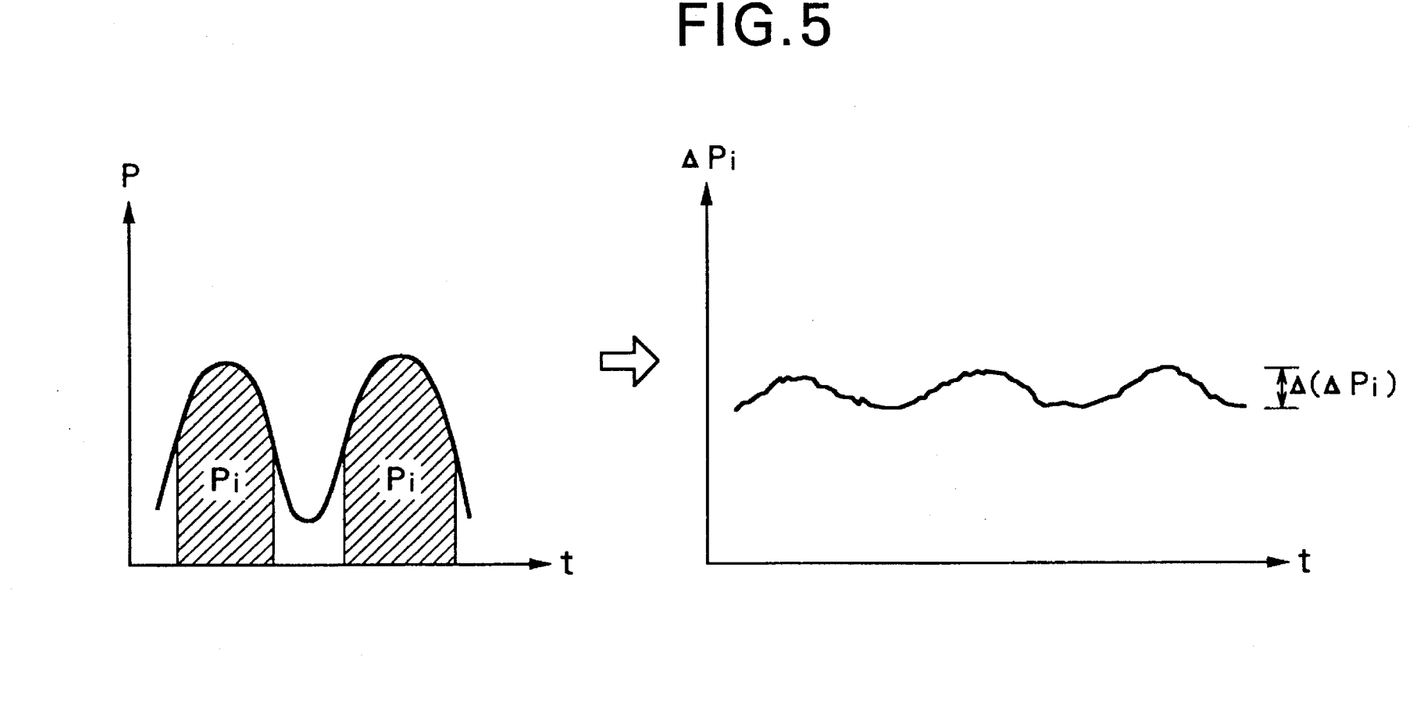
FIG. 5 is a diagram illustrating parameters representing combustion pressure fluctuations according to the embodiment.

Subsequently in step 7, a difference between the latest computed $\Delta Pi_m$ and a previous difference value $\Delta Pi_{m-1}$ $(\Delta(\Delta Pi_m)=\Delta Pi_m-Pi_{m-1})$is set as a parameter $\Delta(\Delta Pi_m)$ which indicates the fluctuation amplitude of the combustion pressure (refer to FIG. 5).

In step 8, it is judged if the fluctuation frequency of the parameter $\Delta(\Delta N_{em})$ indicating fluctuation amplitude of the rotational speed, and the fluctuation frequency of the parameter $\Delta(\Delta Pi_m)$ indicating fluctuation amplitude of the combustion pressure are in approximate agreement.

In comparing the frequencies (being one of the fluctuation characteristics in the present embodiment) in step 8, filtering may be carried out to extract only a predetermined low frequency component (for example from 0 to 10 Hz) of the parameters $\Delta(\Delta N_{em})$ and $\Delta(\Delta Pi_m)$, and judgment of whether or not the fluctuation frequencies are in approximate agreement may be made based on a power spectrum of the predetermined low frequency components.

In step 8, when the fluctuation frequency of the parameter $\Delta(\Delta N_{em})$ indicating fluctuation amplitude of the rotational speed, and the fluctuation frequency of the parameter $\Delta(\Delta Pi_m)$ indicating fluctuation amplitude of the combustion pressure are different, control proceeds to step 10 where a judgment signal is output indicating that the road on which the vehicle is at present travelling is at least not a rough road which can exert a bad influence on the misfire diagnosis (to be explained later).

When the vehicle is travelling on a rough road (bumpy road or gravel road etc.), the rear wheels 6 are subject to reaction forces from the road surface so that rotational speed fluctuations arise. These are transmitted back to the engine 1 via the rear axle shaft 5, the differential 4, the propeller shaft 3, and the transmission 2, becoming a cause of fluctuations in the engine 1. At this time this main cause of fluctuation which is transmitted back from the rear wheels 6 to the engine 1 acts with a compelling force on both the engine rotational speed and the combustion pressure. Therefore it can be assumed that when this main couse of fluctuation from the rear wheels 6 is generated, both fluctuation frequencies will be in approximate agreement. When the fluctuation frequencies are not in agreement, the rough road travel condition which is the common main cause of fluctuation is not present.

Here at the time of rough road travel where the main cause of fluctuation from the rear wheels 6 is transmitted back to the engine 1, there is the likelihood of the rotational speed fluctuations and combustion pressure fluctuations due to rough road travel being erroneously detected as due to misfire. However, if not travelling on a rough road, since there is no likelihood of erroneous detection, then misfire diagnosis can be carried out based on rotational speed fluctuations, and combustion pressure fluctuations.

Accordingly, in step 10, a signal indicating non-rough road travelling conditions is output, and control proceeds to step 11 to carrying out misfire diagnosis.

Figure 6:
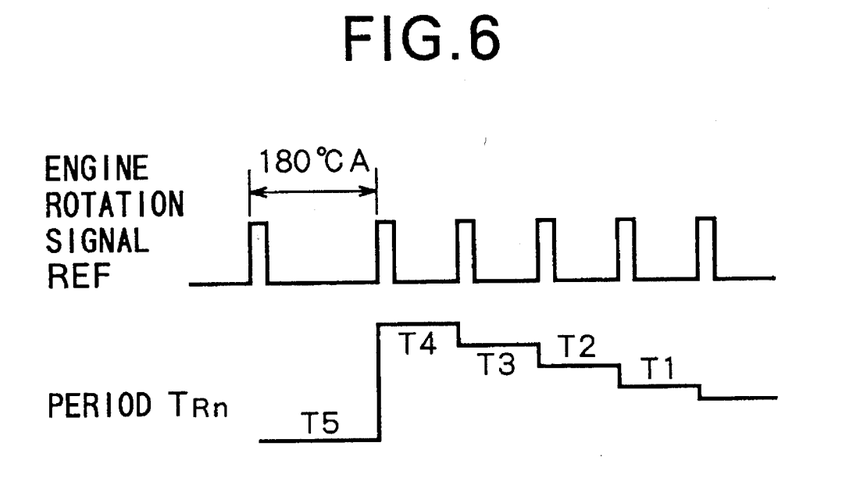
FIG. 6 is a time chart showing characteristics for misfire diagnosis based on engine rotational speed fluctuations according to the embodiment.

Misfire diagnosis in step 11, is carried out for example using the beforementioned period $T_{Rn}$. A misfire judgment value MISA can be computed as follows:

$$MISA=\{3\times(T4-T5)+(T4-T1)\}/T5^3$$

where T1 is the latest value for the period $T_{Rn}$, T5 is the period $T_{Rn}$ for one cycle beforehand, and T4 is the measured period after period T5, (see FIG. 6). When the misfire judgment value MISA is above a reference value set in accordance with the engine rotational speed and engine load, a detection signal indicating the occurrence of misfire is output.

Moreover, a construction is possible wherein misfire diagnosis is carried out based on the beforementioned combustion pressure integral value Pi. In this case, when the combustion pressure integral value Pi falls below a reference value set in accordance with the engine rotational speed and engine load, a detection signal indicating the occurrence of misfire is output.

It will be clear however, that the arrangement for misfire diagnosis based on rotational speed or combustion pressure is not limited to the above described examples.

Referring back to step 8, when the fluctuation frequency of the parameter $\Delta(\Delta N_{em})$ indicating fluctuation amplitude of the rotational speed, and the fluctuation frequency of the parameter $\Delta(\Delta Pi_m)$ indicating fluctuation amplitude of the combustion pressure are judged to be approximately in agreement, then it is likely that rough road travel is the main cause of the fluctuations, however it is only judged from the agreement of the fluctuation frequencies, that the same main cause of fluctuations is participating. Therefore, since it is not possible to conclude that the main cause of fluctuations is due to rough road travel, control proceeds to step 9 where it is judged whether or not conditions are such as to produce rotational speed and combustion pressure fluctuations with rough road travel as the main cause, based on a relative comparison of the parameter $\Delta(\Delta N_{em})$ indicating fluctuation amplitude of the rotational speed, and the parameter $\Delta(\Delta Pi_m)$ indicating fluctuation amplitude of the combustion pressure.

In step 9, it is judged whether or not the ratio $\Delta(\Delta N_{em})/\Delta(\Delta Pi_m)$ of the beforementioned parameters, exceeds a predetermined value.

In the case of fluctuations being transmitted back from the rear wheels 6 to the engine 1 due to rough road travel, the degree of influence of this main cause of fluctuations on the rotational speed fluctuations is higher than on the combustion pressure fluctuations. Therefore at the time of rough road travel the rotational speed fluctuations tend to be larger than a correlation of the combustion pressure fluctuations and the rotational speed fluctuations (fluctuation characteristics) for non-rough road travel.

More specifically, the main cause of fluctuations transmitted back from the rear wheels 6 to the engine 1, are transmitted to the output shaft of the engine 1 via the propeller shaft 3 and the transmission 2, and exert an influence on the rotational speed of the flywheel 9 which is supported on the output shaft. However the combustion pressure fluctuations further influence via the output shaft (crank shaft), connecting rod, and piston. Therefore a greater influence is felt at the rotation detection portion closer to the generation location of the main cause of fluctuations (the rear wheels 6).

Accordingly, when in step 9 it is judged that the ratio $\Delta(\Delta N_{em})/\Delta(\Delta Pi_m)$ exceeds a predetermined value, then the rotational speed fluctuations and combustion pressure fluctuations which are determined to be generated from the same cause due to the agreement of the fluctuation frequencies, are judged to be those originating from rough road travel of the vehicle. Therefore in step 12 a signal indicating rough road travel conditions of the vehicle is output. At this time, control does not proceed to the misfire diagnosis step 11, thus avoiding erroneous detection of misfire when the fluctuations in rotational speed and combustion pressure due to the rough road travel arise.

When judged that the ratio $\Delta(\Delta N_{em})/\Delta(\Delta Pi_m)$ is less than or equal to the predetermined value, it is considered that the rotational speed and combustion pressure are fluctuating at the same frequency, but the fluctuations are at least not due to rough road travel. Control therefore proceeds to step 10 to carry out normal misfire diagnosis.

With the above described construction for judging the presence or absence of rough road travel conditions by comparing the fluctuation characteristics of the rotational speed, and the fluctuation characteristics of combustion pressure, a special sensor is not required. Moreover, since the fluctuations of rotational speed and combustion pressure are used, which are parameters used in the misfire detection, then rough road travel conditions which influence misfire detection can be precisely determined, and used as information for inhibiting processing of the misfire diagnosis. Therefore, erroneous detection of misfire due to rough road travel can be reliably avoided, and the opportunity for misfire diagnosis can be sufficiently maintained.

With the present embodiment, the judgment results of whether or not there is rough road travel are used to determine whether or not misfire diagnosis can be made based on rotational speed and combustion pressure. However, the detection results for rough road travel can also be used for example for speed change pattern control in an automatic transmission, or for the judgment control of the slip ratio of an anti-lock braking system.

Moreover, with the present embodiment, the construction is such that the rotation signal of the engine 1 is taken from the flywheel 9. However a construction is also possible wherein the rotation signal is taken from the camshaft. Taking the rotation signal from the flywheel 9 is preferable however since, during rough road travel, the fluctuations in the rotational speed detection value will be larger, thereby enabling a higher rough road detection accuracy.

Also, with the present embodiment, the construction is such that misfire detection is inhibited during rough road travel. However a construction is also possible wherein a reference level used in the misfire detection, is corrected during rough road travel, so as to make misfire detection difficult, thereby essentially avoiding the output of a misfire detection signal.

I claim:

1. An apparatus for detecting rough road travel of a vehicle, said apparatus comprising:

rotational speed detection means for detecting a rotational speed of an engine, combustion pressure detection means for detecting a combustion pressure of the engine, and rough road judgment means for comparing a fluctuation characteristic of rotational speed detected by said rotational speed detection means, and a fluctuation characteristic of combustion pressure detected by said combustion pressure detection means, and outputting a judgement signal indicating whether or not a road on which the vehicle is travelling is a rough road.

2. An apparatus for detecting rough road travel of a vehicle according to claim 1, wherein said fluctuation characteristic for said rough road judgment means is at least one of; fluctuation frequency and fluctuation amplitude.

3. An apparatus for detecting rough road travel of a vehicle according to claim 1, wherein said fluctuation characteristic for said rough road judgment means is the fluctuation frequency, and a signal indicating that a road on which the vehicle is travelling is a non-rough road is output when the fluctuation frequency of the engine rotational speed and the fluctuation frequency of the combustion pressure are not in agreement, and a signal indicating that the road on which the vehicle is travelling is a rough road is output at least under condition where the fluctuation frequency of the engine rotational speed and the fluctuation frequency of the combustion pressure are in agreement.

4. An apparatus for detecting rough road travel of a vehicle according to claim 1, wherein the fluctuation characteristic for the rough road judgement means is a fluctuation frequency and a fluctuation amplitude, and a signal indicating that a road on which the vehicle is travelling is a rough road is output when the fluctuation frequency of the engine rotational speed and the fluctuation frequency of the combustion pressure are in approximate agreement and a fluctuation amplitude of the engine rotational speed is greater by a predetermined value or above than a fluctuation amplitude of the combustion pressure, and a signal indicating that the road on which the vehicle is travelling is not a rough road is output in other cases.

5. An apparatus for detecting rough road travel of a vehicle according to claim 1, wherein said rotational speed detection means takes an engine rotation signal from the engine flywheel.

6. An apparatus for detecting misfire of a vehicle engine, provided with the apparatus for detecting rough road travel of a vehicle according to claim 1, and comprising:

misfire detection means for detecting misfire of the engine based on at least one of engine rotational speed and combustion pressure and outputting a misfire detection signal, and misfire detection inhibiting means for inhibiting output of a misfire detection signal from said misfire detection means, when a signal indicating that the road on which the vehicle is travelling is a rough road is output from said rough road judgment means.

7. A method of detecting rough road travel of a vehicle including, outputting a signal indicating that a road on which the vehicle is travelling is a non-rough road when a fluctuation frequency of an engine rotational speed and a fluctuation frequency of a combustion pressure are not in agreement, and outputting a signal indicating that the road on which the vehicle is travelling is a rough road, at least under conditions where the fluctuation frequency of the engine rotational speed and the fluctuation frequency of the combustion pressure are in agreement.

8. A method of detecting misfire of a vehicle engine, including detecting engine misfire based on at least one of engine rotational speed and combustion pressure, and outputting a misfire detection signal only when, in accordance with the method of detecting rough road travel of a vehicle according to claim 7, a signal is output indicating that a road on which the vehicle is travelling is not a rough road, and inhibiting said output of a misfire detection signal when a signal is output indicating that the road on which the vehicle is travelling is a rough road.

9. A method of detecting rough road travel of a vehicle including, outputting a signal indicating that a road on which the vehicle is travelling is a rough road when a fluctuation frequency of an engine rotational speed and a fluctuation frequency of a combustion pressure are in approximate agreement and a fluctuation amplitude of the engine rotational speed is greater by a predetermined value or above than a fluctuation amplitude of the combustion pressure, and outputting a signal indicating that the road on which the vehicle is travelling is not a rough road in other cases.

10. A method of detecting misfire of a vehicle engine, including detecting engine misfire based on at least one of engine rotational speed and combustion pressure, and outputting a misfire detection signal only when, in accordance with the method of detecting rough road travel of a vehicle according to claim 9, a signal is output indicating that a road on which the vehicle is travelling is not a rough road, and inhibiting said output of a misfire detection signal when a signal is output indicating that the road on which the vehicle is travelling is a rough road.

* * * * *